United States Patent [19]

Mayer

[11] Patent Number: 4,744,241
[45] Date of Patent: May 17, 1988

[54] METHOD AND DEVICE FOR DETECTING A WEAR LIMIT OR BREAK IN THE CUTTING EDGE OF A TOOL

[75] Inventor: Kurt Mayer, Essen, Fed. Rep. of Germany

[73] Assignee: Fried. Krupp Gesellschaft mit beschränkter Haftung, Essen, Fed. Rep. of Germany

[21] Appl. No.: 915,126

[22] Filed: Oct. 3, 1986

[30] Foreign Application Priority Data

Oct. 4, 1985 [DE] Fed. Rep. of Germany ....... 3535474

[51] Int. Cl.$^4$ ............................................. B23Q 17/09
[52] U.S. Cl. ...................................... 73/104; 407/113; 407/120; 408/6; 408/11; 409/187; 409/194
[58] Field of Search ...................... 407/113, 119, 120; 82/34 R, DIG. 4; 73/104; 340/680; 408/6, 11; 409/134, 187, 194

[56] References Cited

U.S. PATENT DOCUMENTS 3,669,557 6/1972 Mitchell ............................ 340/680
4,694,686 9/1987 Fildes et al. .......................... 73/104

FOREIGN PATENT DOCUMENTS 0216401 4/1983 Fed. Rep. of Germany .
0209691 12/1987 Fed. Rep. of Germany .
0090870 12/1987 Fed. Rep. of Germany .

Primary Examiner—Frederick R. Schmidt
Assistant Examiner—Lawrence Cruz
Attorney, Agent, or Firm—Spencer & Frank

[57] ABSTRACT

A method and arrangement for detecting a wear limit or break in a cutting edge of a machine tool. At least two conductor paths are embedded in the cutting material forming the cutting edge, one of the conductor paths being part of a closed circuit while the other is part of an open circuit. A signal serving to break off the machining process is produced if either the conductor path disposed in the circuit is interrupted or the open circuit is closed by the creation of a conductive connection between the two conductor paths.

18 Claims, 5 Drawing Sheets

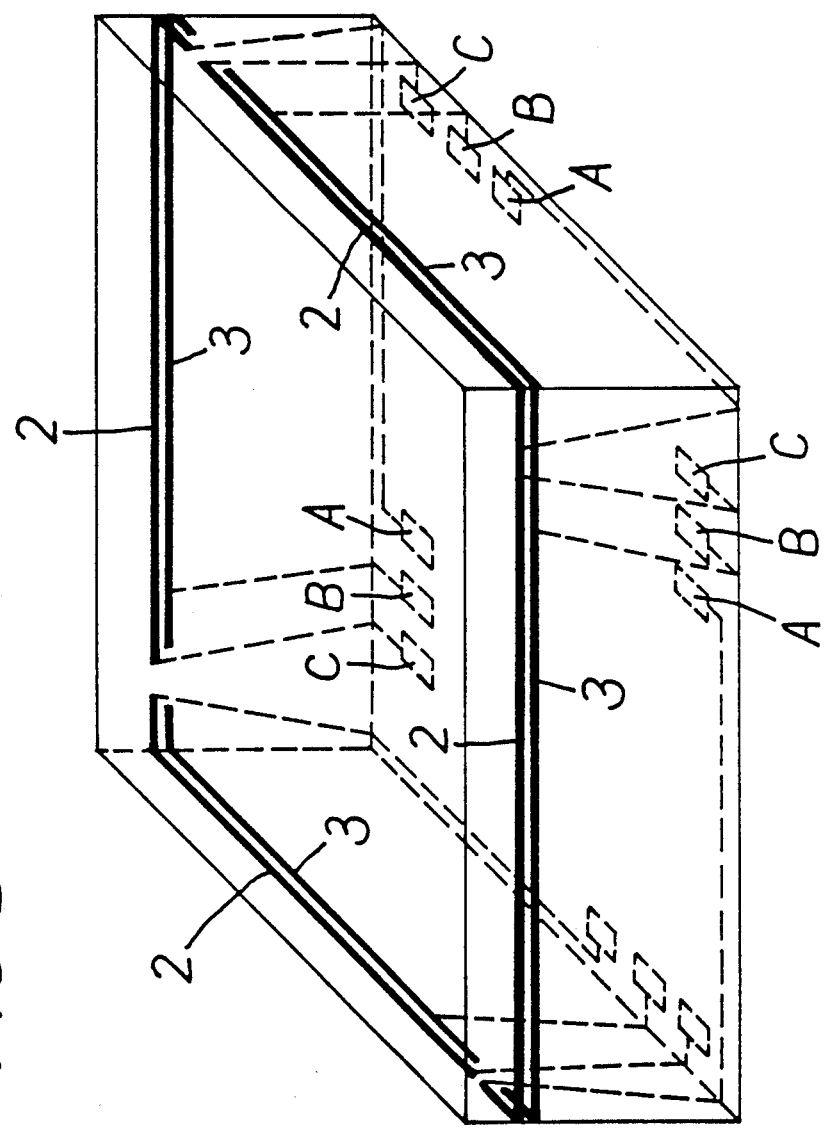

METHOD AND DEVICE FOR DETECTING A WEAR LIMIT OR BREAK IN THE CUTTING EDGE OF A TOOL

BACKGROUND OF THE INVENTION

The present invention relates to a method and arrangement for detecting a wear limit or break in a cutting edge of a tool having at least one insulated conductor path embedded in its cutting plate and connected with a voltage source so as to form part of a circuit for actuating a signal to break off the machining process.

For an electrically nonconductive ceramic cutter, a system has been proposed for the early detection of a break in the cutting edge according to which a crack in a region of a secondary cutting edge is detected. The detection of such a break interrupts a circuit by destroying a thin conductor path that has been vapor-deposited onto the free secondary face of the tool, thus interrupting the machining process.

This system, up to now, has been used only experimentally. It has not found acceptance in practice because it has considerable drawbacks. In manufacturing processes, electrically conductive workpieces as well as electrically nonconductive workpieces are processed by means of electrically conductive or electrically nonconductive cutting materials, either dry or together with electrically conductive or nonconductive cooling and lubricating agents. It is, therefore, not predictable whether and when in the prior system a current flowing through the circuit is actually interrupted due to the formation of a crack. For example, an electrically conductive bridge may be formed across the crack by particles of the material of the workpiece or the coolant or by particles of an electrically conductive cutting substance and also by contact with the workpiece itself so that, in spite of the fact that the limit of permissible wear has been reached or a break in the cutting edge has occurred, the signal for breaking off the machining process is not initiated.

SUMMARY OF THE INVENTION

It is an object of the present invention to overcome the aforementioned drawback and to provide a method and an arrangement which reliably furnishes the required signal even if, for whatever reason, an interruption in the conductive path is bridged.

The above and other objects are accomplished according to the invention by the provision of a method for detecting a wear limit or break in a cutting edge of a tool used in a machining process, wherein the cutting edge is formed of material subject to wear. The method includes embedding two insulated conductor paths in the cutting material; connecting each insulated conductor path to a source of voltage so that one of the conductor paths forms part of a closed circuit and the other of the conductor paths forms part of an open circuit; producing a signal for interrupting a machining process if either the conductor path in the closed circuit is interrupted or the conductor path in the open circuit is closed.

According to a further aspect of the invention, an arrangement is provided for detecting a wear limit or break in a cutting edge of a tool used in a machining process, wherein the arrangement includes: a cutting tool having a cutting edge formed by cutting material subject to wear; first and second insulated conductor paths embedded in the cutting material; a source of voltage connected to each conductor path; first and second circuit means each for actuating a signal to interrupt the machining process, the first circuit means including the source of voltage, first switch means and the first conductor path connected to form a closed circuit with the voltage source and the first switch means, the second circuit including the voltage source, second switch means and the second conductor path connected to form an open circuit with the voltage source and the second switch means, wherein the first switch means is connected for actuating a signal to interrupt the machining process if the first conductor path in the closed circuit is interrupted, and the second switch means is connected for actuating a signal to interrupt the machining process if the second conductor path in the open circuit is closed.

In carrying out the invention, two conductor paths, which have thin cross sections and are insulated against one another and toward the exterior of the cutting plate (and if the cutting plate comprises an electrically conductive substrate, also against the substrate), are embedded in the material of the cutting edge so that the two conductor paths are parallel to one another in a side by side arrangement or one above the other. The two conductor paths are connected to a voltage source by way of contact points so that one conductor path is part of a closed circuit and the other conductor path is part of an open circuit. The signal for breaking off the machining process is produced if either the closed circuit is interrupted by wear or a break in the cutting edge, or the open circuit is closed, after removal of the insulating layer due to wear or a break, in that a conductive bridge is formed.

In machining tools, such conductor paths may be disposed at the free faces or at the cutting faces along the primary cutting edges, the secondary cutting edges, or separately for each cutting edge or pair of cutting edges at the primary and secondary cutting edges. According to the invention, a plurality of pairs of conductor paths, connected with mutually independent circuits, may be arranged along one cutting edge. The various circuits may be used to switch different drives of a machine tool, e.g. the drives for switching the feed or the main drive.

Such combinations of pairs of conductor paths may be used so that, for example, the operating parameters and thus the load on the tool is reduced by the circuits of one pair of conductors while only the pulse generated by the circuits of the other pair of conductors ultimately interrupts the machining process if machining of the workpiece is not completed when it occurs.

Reversible cutting plates made of hard substances are particularly well suited for use in combination with arrangements employing the method according to the invention. If the reversible cutting plates are made of an electrically conductive material, e.g. of a hard metal, the plate may initially be coated with a very thin electrically nonconductive ceramic layer, e.g. of aluminum oxide, aluminum oxynitride or silicon nitride. This can be accomplished, as known, by coating the plate with the aid of the so-called PVD [precipitation vapor deposition] or CVD [chemical vapor deposition] process. In the same way, the conductor paths can be produced in that a layer of a conductive material, e.g. titanium carbide, titanium carbonitride or titanium nitride is applied. This layer can be applied within limits to the locations intended for it or over the entire surface area. If the layer is applied to the entire surface area, the conductor paths are produced by subsequent working. The insulating layer toward the exterior may again be a second ceramic layer precipitated according to one of the abovementioned methods. However, electroplating processes or screen printing may also be used to apply insulating layers and conductor paths. The important factor is here that the wear resistance of the insulating layers to be applied must correspond at least to that of the cutting materials employed, better yet be superior to them. This requirement is met if a hard metal or a ceramic material is employed as the cutting substance together with nonconductive ceramic layers. However, all other known hard substances, when used in the proper association, are suitable for the production of nonconductive, i.e. insulating, layers and to produce the conductor paths of devices for implementing the method.

Various embodiments of the invention are illustrated schematically in the drawing figures described below.

BRIEF DESCRIPTION OF THE DRAWINGS

FIG. 1b is a schematic drawing showing another embodiment of the circuits of FIG. 1a.

FIG. 3 is a schematic drawing showing an arrangement of conductor paths according to the invention in a cutting bit that can be used on four sides.

DESCRIPTION OF THE PREFERRED EMBODIMENTS

Figure 1A:
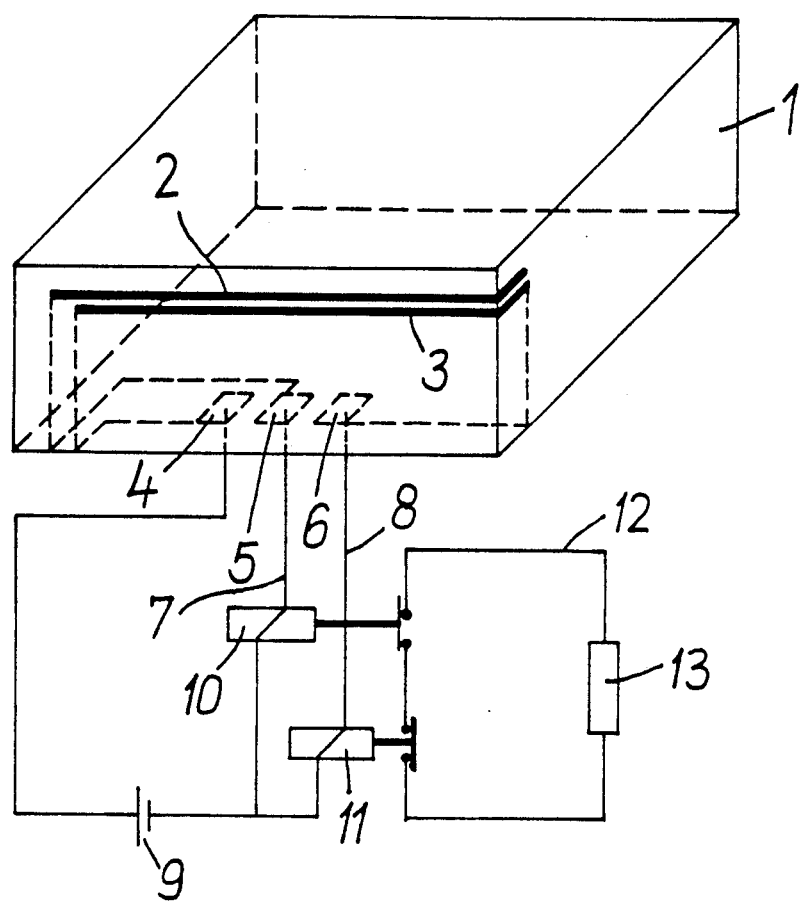
FIG. 1a is a schematic drawing of an embodiment according to the invention showing a reversible cutting plate having two electrical conductor paths and associated electrical circuits.

FIG. 1a shows a reversible cutting plate 1 equipped with conductor paths 2 and 3, made, for example of titanium nitride. These conductor paths are connected with circuits 7 and 8, respectively, by way of contact points 4, 5, 6. Circuits 7 and 8 are fed by a voltage source 9. Switching elements 10 and 11 are provided in circuits 7 and 8, respectively, for actuating a machine control 13 by way of circuit 12.

FIG. 1a shows that conductor path 2 belongs to open circuit 7 and conductor path 3 belongs to closed circuit 8. FIG. 1a further shows that switching elements 10 and 11 operate to open circuit 12 to actuate machine control 13 for interrupting the machining process if open circuit 7 is closed by the establishment of a conductive connection between conductor paths 2 and 3 or if closed circuit 8 is opened due to the interruption of conductor path 3.

Figure 1B:
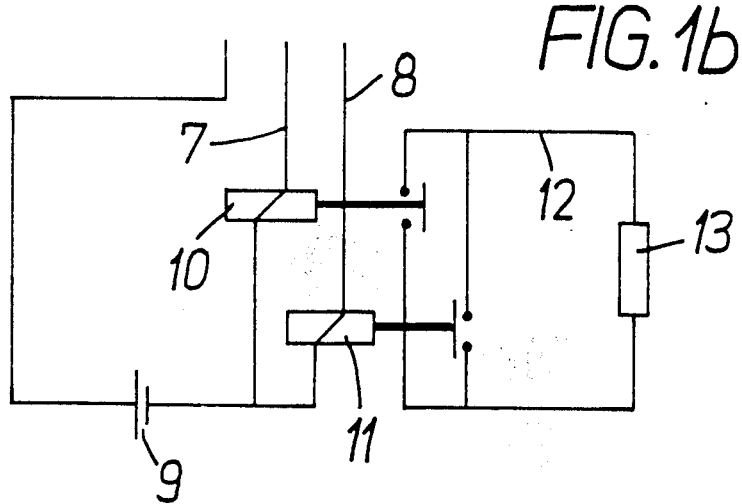

The switching scheme shown in FIG. 1b represents a variation of the circuit of FIG. 1a. In FIG. 1b the control signal is generated not by opening of switching elements 10 or 11, but by their closing.

Figure 2:
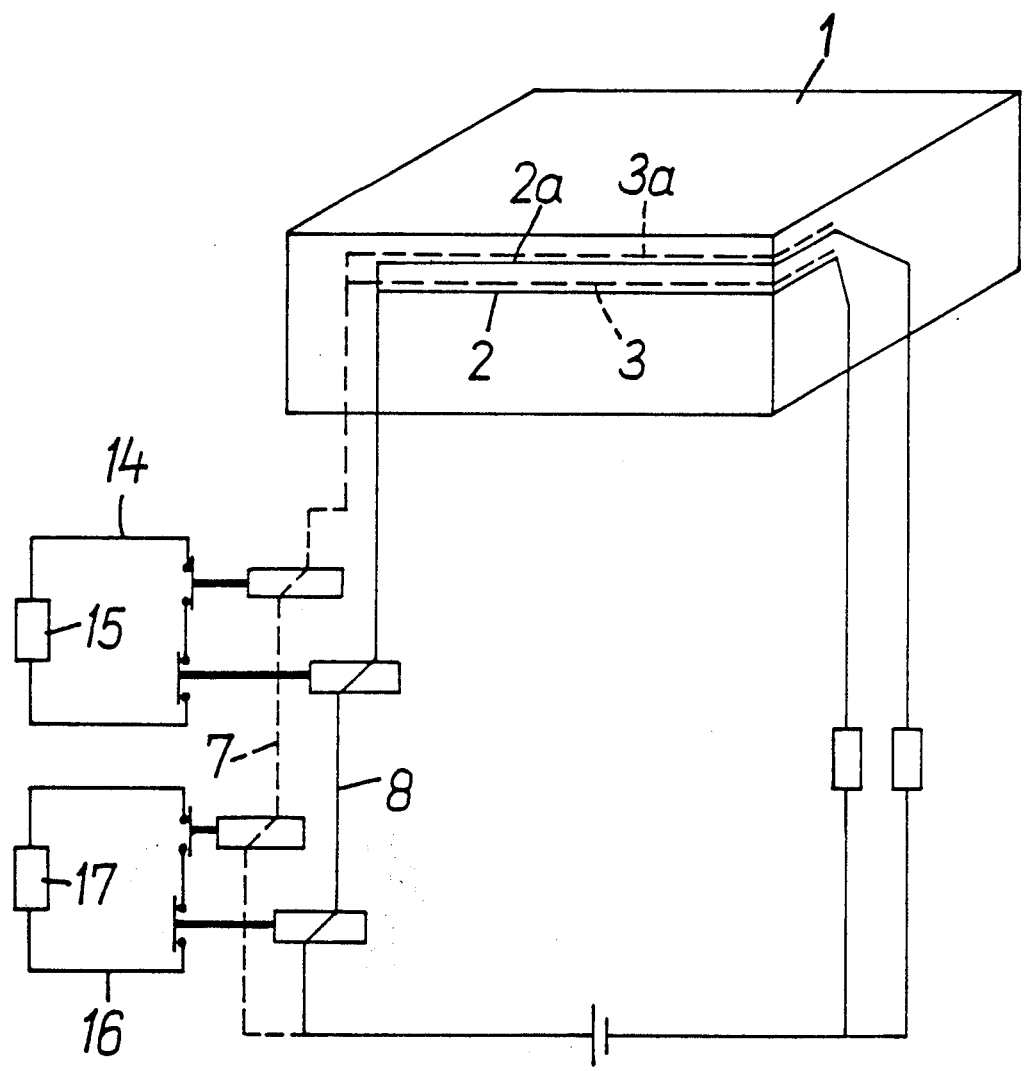
FIG. 2 schematic drawing showing a further variation of the circuits of FIGS. 1a and 1b with four electrical conductor paths.

FIG. 2 shows an arrangement comprising multiple pairs of conductor paths which act on separate regulating circuits 14 and 16. Reference numerals 2 and 3 as well as 2a and 3a represent conductor paths. For example, these conductor paths are embedded in layers made of an electrically nonconductive material, for example of aluminum oxide, and are applied to the basic hard metal body of a reversible cutting plate 1. Conductor paths 3 and 3a each form parts of open circuit 7, and conductor paths 2 and 2a are parts of closed circuit 8. With such an arrangement, it is possible to generate switching pulses at different intensities, which, for example, give different pulses to the machine controls 15 and 17 by way of circuits 14 or 16, respectively.

FIG. 3 shows an arrangement of the conductor paths within a reversible cutting plate having four cutting edges and the connection of the conductor paths with the required external contacts. Conductor paths 2 and 3 are brought in an insulated manner to contact points A, B, C, whose countercontacts (not shown) are disposed in, for example, a tool holder, an adaptor or an intermediate member so that they always make contact with three associated contact faces of the respective cutting edge which is in the working position in the reversible cutting plate. If the reversible cutting plate is rotated so as to bring a new cutting edge into the working position, the respective new contacts of the reversible cutting plate move into the connection position. One pair of conductor paths 2 and 3 extends, for example, over almost the entire length of the primary cutting edge and over a small region of the secondary cutting edge. The connections of conductor paths 2 and 3 with contact points A, B, C, which may be produced in the same manner as the conductor paths themselves, are shown by dashed lines in FIG. 3.

Figure 4B:
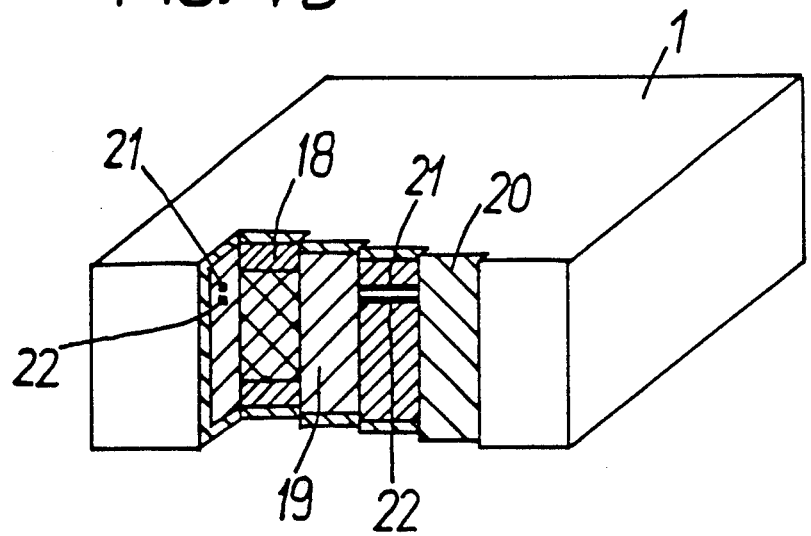
FIG. 4b is a schematic isometric drawing, partially cutaway, showing a reversible cutting plate made of a hard metal and having two superposed conductor paths per cutting edge.
Figure 4A:
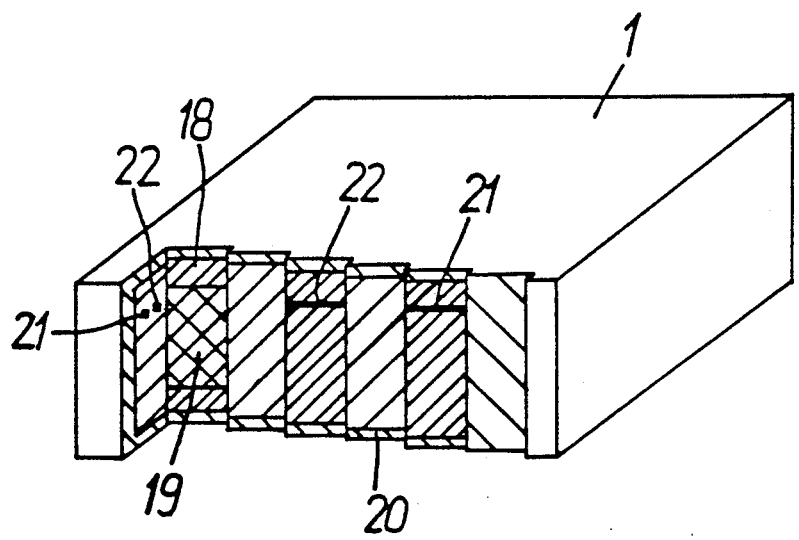
FIG. 4a is a schematic isometric drawing, partially cutaway, showing a reversible cutting plate made of a hard metal and having two juxtaposed conductor paths per cutting edge.

FIGS. 4a and 4b show a cutaway of the construction of a reversible cutting plate 1 made of a hard metal and incorporating the conductor paths according to the invention in its insulating and cover layers which are made of a ceramic, electrically nonconductive material. The hard metal substrate bears the reference numeral 18. With the aid of known CVD or PVD methods, a first layer 19 of aluminum oxide is applied to the substrate. Then a metallic conductor path 22 of titanium nitride is applied to layer 19 on top of which a further cover layer 20 of aluminum oxide is applied. Another metallic conductor path 21 of titanium nitride is thereafter applied to layer 20 next to conductor path 22 (i.e., in a different plane) and at the same height. Another insulating layer (not shown) of aluminum oxide is applied to cover conductor path 21. The variation shown in FIG. 4b differs from the embodiment of FIG. 2a in that conductor paths 21 and 22 are not disposed next to one another, but on top of one another in the same plane.

FIGS. 5a to 5h are simplified views of different arrangements of the conductor paths in a reversible cutting plate. Of course, in reversible cutting plates, the conductor paths shown in FIGS. 5a to 5h can also be provided at each cutting edge.

Figure 5A:
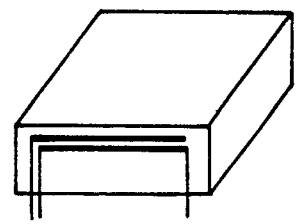
FIGS. 5a to 5h are schematic drawings showing different arrangements of conductor paths in cutting plates made of hard metal and having electrically conductive or electrically nonconductive substrates.
Figure 5B:
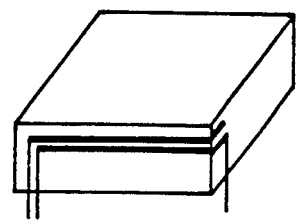

FIG. 5a shows the parallel arrangement of a pair of conductor paths at the free surface of a primary cutting edge. FIG. 5b shows a corresponding arrangement in which, however, the conductor paths also extend over to the free surface of the secondary cutting edge.

Figure 5C:
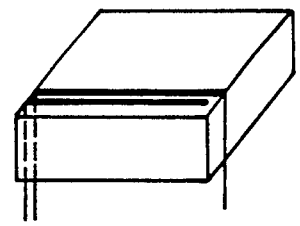
Figure 5D:
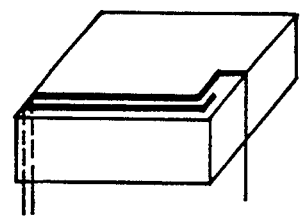

In the embodiment of FIG. 5c, the pair of conductor paths is arranged in the cutting face parallel to the primary cutting edge; in FIG. 5d parallel to the primary and secondary cutting edges.

Figure 5E:
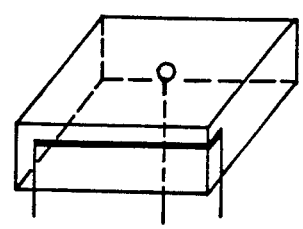

The embodiment according to FIG. 5e shows the arrangement of a conductor path with the use of an electrically conductive substrate. Here, the open circuit may be conducted over the substrate, with the closed circuit being disposed opposite thereto and separated therefrom by a layer of insulating material.

Figure 5F:
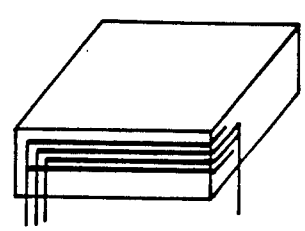

FIG. 5f shows the arrangement of two pairs of conductor paths per cutting edge so as to produce stepped signals for the control of different working parameters.

Figure 5G:
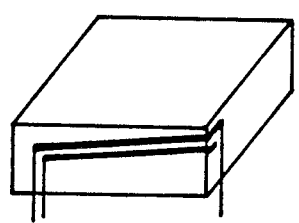
Figure 5H:
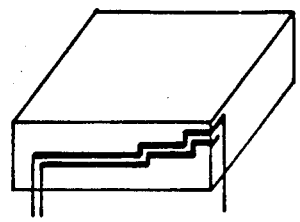

In the embodiment of FIG. 5g, the conductor paths are arranged at an angle to the primary cutting edge; in FIG. 5h they are arranged in steps with respect to the primary cutting edge. These two embodiments have the advantage that it is possible to set different wear limits for actuation of the signal in dependence on the location of the cutting edge.

The present disclosure relates to the subject matter disclosed in German Serial No. P 35 35 474.7 of Oct. 4, 1985, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. Method for detecting a wear limit or break in a cutting edge of a tool used in a machining process, the cutting edge being formed of material subject to wear, said method comprising:
   embedding two insulated conductor paths in said cutting material;
   connecting each insulated conductor path to a source of voltage so that one of the conductor paths forms part of a closed circuit and the other of the conductor paths forms part of an open circuit;
   producing a signal for interrupting a machining process if either the conductor path in the closed circuit is interrupted or if the conductor path in the open circuit is closed.

2. Method as defined in claim 1, wherein said tool includes a hard metal reversible cutting plate comprising electrically nonconductive layers and said conductor paths are embedded in said layers, and said embedding step includes producing the electrically nonconductive layers and the conductor paths by one of a precipitation vapor deposition process and a chemical vapor deposition process.

3. Method as defined in claim 1, wherein said tool includes a hard metal reversible cutting plate comprising electrically nonconductive layers and said conductor paths are embedded in said layers, and said embedding step includes producing said conductor paths by a thin-film technique.

4. Method as defined in claim 1, wherein said tool includes a hard metal reversible cutting plate comprising electrically nonconductive layers and said conductor paths are embedded in said layers, and said embedding step includes producing said conductor paths by screen printing.

5. Arrangement for detecting a wear limit or break in a cutting edge of a tool used in a machining process, said arrangement comprising:
   a cutting tool having a cutting edge formed by cutting material subject to wear;
   first and second insulated conductor paths embedded in said cutting material;
   a source of voltage connected to each said conductor path; and
   first and second circuit means each for actuating a signal to interrupt the machining process,
   said first circuit means including said source of voltage, a first switch means and said first conductor path connected to form a closed circuit with said voltage source and said first switch means,
   said second circuit means including said voltage source, a second switch means and said second conductor path connected to form an open closed circuit with said voltage source and said second switch means,
   said first switch means being connected for actuating a signal to interrupt the machining process if said first conductor path in the closed circuit is interrupted, and
   said second switch means being connected for actuating a signal to interrupt the machining process if said second conductor path in the open circuit is closed.

6. Arrangement as defined in claim 5, wherein said tool has primary cutting edges and said conductor paths are arranged along said primary cutting edges.

7. Arrangement as defined in claim 5, wherein said tool includes a hard metal reversible cutting plate comprising electrically nonconductive layers and said conductor paths are embedded in said layers.

8. Arrangement as defined in claim 7, wherein said first and second conductor paths are disposed close to one another.

9. Arrangement according to claim 7, wherein said first and second conductor paths are arranged tightly on top of one another.

10. Arrangement as defined in claim 7, wherein said tool comprises a substrate which is in conductive connection with said voltage source and said second conductor path of the open circuit is formed by said substrate.

11. Arrangement as defined in claim 7, wherein said tool comprises a reversible cutting plate having exterior faces provided with electrical contact points, said conductor paths are electrically connected with said contact points, and said contact points are disposed for resting on countercontacts of a holder for said reversible cutting plate.

12. Arrangement as defined in claim 7, wherein said tool has primary and secondary cutting edges and said conductor paths are arranged along said secondary cutting edges.

13. Arrangement as defined in claim 7, wherein said cutting plate has a plurality of working positions and said conductor paths comprise mutually independent pairs of first and second conductor paths provided at each working position of the cutting plate.

14. Arrangement as defined in claim 7, wherein said conductor paths comprise a plurality of pairs of first and second conductor paths forming parts of open and closed circuits, respectively, and said plurality of pairs of first and second conductor paths are arranged, respectively, at predetermined distances from said cutting edge for causing different switching pulses to be generated when said conductor paths are interrupted or closed, respectively.

15. Arrangement as defined in claim 7, wherein said electrically nonconductive layers are made of electrically nonconductive hard substances.

16. Arrangement as defined in claim 15, wherein said hard substances include at least one of aluminum oxide, aluminum oxynitride or silicon nitride.

17. Arrangement as defined in claim 7, wherein said conductor paths are made of electrically conductive hard substances.

18. Arrangement as defined in claim 17, wherein said hard substances include at least one of titanium carbide, titanium carbonitride and titaniun nitride.

* * * * *